US011426006B2

(12) United States Patent
Shakal

(10) Patent No.: US 11,426,006 B2
(45) Date of Patent: Aug. 30, 2022

(54) AIR MANIFOLD

(71) Applicant: Sleep Number Corporation, Minneapolis, MN (US)

(72) Inventor: Anthony John Shakal, Rogers, MN (US)

(73) Assignee: Sleep Number Corporation, Minneapolis, MN (US)

( * ) Notice: Subject to any disclaimer, the term of this patent is extended or adjusted under 35 U.S.C. 154(b) by 92 days.

(21) Appl. No.: 16/803,193

(22) Filed: Feb. 27, 2020

(65) Prior Publication Data

US 2020/0187667 A1 Jun. 18, 2020

Related U.S. Application Data

(63) Continuation of application No. 15/337,552, filed on Oct. 28, 2016, now Pat. No. 10,575,654.

(51) Int. Cl.
*A47C 27/08* (2006.01)
*A47C 27/10* (2006.01)
*A47C 31/00* (2006.01)
*G05D 7/06* (2006.01)

(52) U.S. Cl.
CPC .......... *A47C 27/083* (2013.01); *A47C 27/082* (2013.01); *A47C 27/10* (2013.01); *A47C 31/008* (2013.01); *G05D 7/0652* (2013.01)

(58) Field of Classification Search
CPC ..... A47C 27/08; A47C 27/082; A47C 27/083; A47C 27/10; A47C 31/008; G05D 7/00; G05D 7/0652
See application file for complete search history.

(56) References Cited

U.S. PATENT DOCUMENTS

| | | |
|---|---|---|
| 2,685,906 A | 8/1954 | Williams |
| 3,513,876 A | 5/1970 | Tarbox |
| 3,552,436 A | 1/1971 | Stewart |
| 3,784,994 A | 1/1974 | Kery |
| 4,167,200 A | 9/1979 | Bouteille |
| 4,427,022 A | 1/1984 | Forney |
| 4,491,157 A | 1/1985 | Hashimoto |
| 4,527,298 A | 7/1985 | Moulton |
| 4,583,566 A | 4/1986 | Kalavitz et al. |
| 4,745,647 A | 5/1988 | Goodwin |
| 4,766,628 A | 8/1988 | Greer et al. |
| 4,788,729 A | 12/1988 | Greer et al. |

(Continued)

FOREIGN PATENT DOCUMENTS

| | | |
|---|---|---|
| EP | 0168213 | 1/1986 |
| WO | WO 1997/000634 | 1/1997 |

OTHER PUBLICATIONS

U.S. Appl. No. 15/337,034, Karschnik et al., filed Oct. 28, 2016.

(Continued)

*Primary Examiner* — Fredrick C Conley
(74) *Attorney, Agent, or Firm* — Fish & Richardson P.C.

(57) ABSTRACT

An air system for use in an air bed system can include a manifold and one or more valves. The manifold can define a an inlet, an outlet, and a vent fluidically connected to atmosphere. A method of operating an air bed system can include deflating an air chamber through the vent in a first valve configuration and through the vent and an exhaust port in a second valve configuration.

20 Claims, 9 Drawing Sheets

(56) References Cited

U.S. PATENT DOCUMENTS

| | | | |
|---|---|---|---|
| 4,797,962 A | 1/1989 | Goode | |
| D300,194 S | 3/1989 | Walker | |
| 4,829,616 A | 5/1989 | Walker | |
| 4,862,921 A | 9/1989 | Hess | |
| 4,890,344 A | 1/1990 | Walker | |
| 4,897,890 A | 2/1990 | Walker | |
| 4,908,895 A | 3/1990 | Walker | |
| 4,915,124 A | 4/1990 | Sember, III | |
| 4,945,588 A | 8/1990 | Cassidy et al. | |
| D313,973 S | 1/1991 | Walker | |
| 4,991,244 A | 2/1991 | Walker | |
| 5,003,654 A | 4/1991 | Vrzalik | |
| 5,095,568 A | 3/1992 | Thomas et al. | |
| 5,142,717 A | 9/1992 | Everard et al. | |
| 5,144,706 A | 9/1992 | Walker et al. | |
| 5,152,319 A | 10/1992 | Hannagan et al. | |
| 5,170,364 A | 12/1992 | Gross et al. | |
| 5,170,522 A | 12/1992 | Walker | |
| 5,193,986 A | 3/1993 | Grant et al. | |
| 5,232,353 A | 8/1993 | Grant | |
| 5,235,713 A | 8/1993 | Guthrie et al. | |
| 5,325,551 A | 7/1994 | Tappel et al. | |
| 5,345,629 A | 9/1994 | Ferrand | |
| 5,425,147 A | 6/1995 | Supplee et al. | |
| D368,475 S | 4/1996 | Scott | |
| 5,509,154 A | 4/1996 | Shafer et al. | |
| 5,509,155 A | 4/1996 | Zigarac et al. | |
| 5,542,136 A | 8/1996 | Tappel | |
| 5,564,140 A | 10/1996 | Shoenhair et al. | |
| 5,570,716 A | 11/1996 | Kamen et al. | |
| 5,586,347 A | 12/1996 | Frischknecht | |
| 5,594,963 A | 1/1997 | Berkowitz | |
| 5,642,546 A | 6/1997 | Shoenhair | |
| 5,652,484 A | 7/1997 | Shafer et al. | |
| 5,765,246 A | 6/1998 | Shoenhair | |
| 5,794,288 A | 8/1998 | Soltani et al. | |
| 5,815,864 A | 10/1998 | Sloop | |
| 5,903,941 A | 5/1999 | Shafer et al. | |
| 5,904,172 A | 5/1999 | Gifft et al. | |
| 5,991,949 A | 11/1999 | Miller, Sr. et al. | |
| 6,037,723 A | 3/2000 | Shafer et al. | |
| 6,092,249 A | 7/2000 | Kamen et al. | |
| 6,108,844 A | 8/2000 | Kraft et al. | |
| 6,161,231 A | 12/2000 | Kraft et al. | |
| 6,202,239 B1 | 3/2001 | Ward et al. | |
| 6,397,419 B1 | 6/2002 | Mechache | |
| 6,483,264 B1 * | 11/2002 | Shafer | A47C 27/083 318/16 |
| 6,686,711 B2 | 2/2004 | Rose et al. | |
| 6,708,357 B2 | 3/2004 | Gaboury et al. | |
| 6,763,541 B2 | 7/2004 | Mahoney et al. | |
| 6,804,848 B1 | 10/2004 | Rose | |
| 6,832,397 B2 | 12/2004 | Gaboury | |
| D502,929 S | 3/2005 | Copeland et al. | |
| 6,883,191 B2 | 5/2005 | Gaboury et al. | |
| 7,389,554 B1 | 6/2008 | Rose | |
| 7,865,988 B2 | 1/2011 | Koughan et al. | |
| 8,282,452 B2 | 10/2012 | Grigsby et al. | |
| 8,336,369 B2 | 12/2012 | Mahoney | |
| 8,444,558 B2 | 5/2013 | Young et al. | |
| D691,118 S | 10/2013 | Ingham et al. | |
| D697,874 S | 1/2014 | Stusynski et al. | |
| D698,338 S | 1/2014 | Ingham | |
| D701,536 S | 3/2014 | Sakal | |
| 8,672,853 B2 | 3/2014 | Young | |
| 8,769,747 B2 | 7/2014 | Mahoney et al. | |
| 8,832,886 B2 | 9/2014 | Riley et al. | |
| 8,893,339 B2 | 11/2014 | Fleury | |
| 8,931,329 B2 | 1/2015 | Mahoney et al. | |
| 8,966,689 B2 | 3/2015 | McGuire et al. | |
| 8,973,183 B1 | 3/2015 | Palashewski et al. | |
| 8,984,687 B2 | 3/2015 | Stusynski et al. | |
| D737,250 S | 8/2015 | Ingham et al. | |
| 9,131,781 B2 | 9/2015 | Zaiss et al. | |
| 9,370,457 B2 | 6/2016 | Nunn et al. | |
| 9,392,879 B2 | 7/2016 | Nunn et al. | |
| 9,510,688 B2 | 12/2016 | Nunn et al. | |
| 9,730,524 B2 | 8/2017 | Chen et al. | |
| 9,737,154 B2 | 8/2017 | Mahoney et al. | |
| 9,770,114 B2 | 9/2017 | Brosnan et al. | |
| D809,843 S | 2/2018 | Keeley et al. | |
| D812,393 S | 3/2018 | Karschnik et al. | |
| 10,149,549 B2 | 12/2018 | Erko et al. | |
| 10,342,358 B1 | 7/2019 | Palashewski et al. | |
| 2002/0023681 A1 | 2/2002 | Ellis et al. | |
| 2004/0163181 A1 | 8/2004 | Wu | |
| 2007/0104592 A1 | 5/2007 | Wu | |
| 2008/0077020 A1 | 3/2008 | Young et al. | |
| 2008/0181795 A1 | 7/2008 | Feingold | |
| 2011/0144455 A1 | 6/2011 | Young et al. | |
| 2012/0304391 A1 * | 12/2012 | Driscoll, Jr | F04D 29/281 5/710 |
| 2013/0031725 A1 * | 2/2013 | Riley | A47C 27/083 5/713 |
| 2014/0182061 A1 | 7/2014 | Zaiss | |
| 2014/0250597 A1 | 9/2014 | Chen et al. | |
| 2014/0257571 A1 | 9/2014 | Chen et al. | |
| 2014/0259417 A1 | 9/2014 | Nunn et al. | |
| 2014/0259418 A1 | 9/2014 | Nunn et al. | |
| 2014/0259431 A1 | 9/2014 | Fleury | |
| 2014/0259433 A1 | 9/2014 | Nunn et al. | |
| 2014/0259434 A1 | 9/2014 | Nunn et al. | |
| 2014/0277611 A1 | 9/2014 | Nunn et al. | |
| 2014/0277778 A1 | 9/2014 | Nunn et al. | |
| 2014/0277822 A1 | 9/2014 | Nunn et al. | |
| 2015/0007393 A1 | 1/2015 | Palashewski | |
| 2015/0025327 A1 | 1/2015 | Young et al. | |
| 2015/0026896 A1 | 1/2015 | Fleury et al. | |
| 2015/0157137 A1 | 6/2015 | Nunn et al. | |
| 2015/0157519 A1 | 6/2015 | Stusynski et al. | |
| 2015/0182033 A1 | 7/2015 | Brosnan et al. | |
| 2015/0182397 A1 | 7/2015 | Palashewski et al. | |
| 2015/0182399 A1 | 7/2015 | Palashewski et al. | |
| 2015/0182418 A1 | 7/2015 | Zaiss | |
| 2015/0290059 A1 | 10/2015 | Brosnan et al. | |
| 2015/0366366 A1 | 12/2015 | Zaiss et al. | |
| 2015/0374137 A1 | 12/2015 | Mahoney et al. | |
| 2016/0100696 A1 | 4/2016 | Palashewski et al. | |
| 2016/0192886 A1 | 7/2016 | Nunn et al. | |
| 2016/0242562 A1 | 8/2016 | Karschnik et al. | |
| 2016/0338871 A1 | 11/2016 | Nunn et al. | |
| 2016/0367039 A1 | 12/2016 | Young et al. | |
| 2017/0003666 A1 | 1/2017 | Nunn et al. | |
| 2017/0035212 A1 | 2/2017 | Nunn et al. | |
| 2017/0049243 A1 | 2/2017 | Nunn et al. | |
| 2017/0196369 A1 | 7/2017 | Nunn et al. | |
| 2017/0303697 A1 | 10/2017 | Chen et al. | |
| 2017/0318980 A1 | 11/2017 | Mahoney et al. | |

OTHER PUBLICATIONS

U.S. Appl. No. 15/337,470, Shakal et al., filed Oct. 28, 2016.
U.S. Appl. No. 15/337,484, Shakal, filed Oct. 28, 2016.
U.S. Appl. No. 15/337,520, Shakal et al., filed Oct. 28, 2016.
U.S. Appl. No. 15/347,572, Peterson et al., filed Nov. 9, 2016.
U.S. Appl. No. 15/684,503, Rose et al., filed Aug. 23, 2017.
U.S. Appl. No. 15/687,796, filed Aug. 28, 2017, Brosnan et al.
U.S. Appl. No. 15/806,810, Gaunt, filed Nov. 8, 2017.
U.S. Appl. No. 15/807,002, Peterson et al., filed Nov. 8, 2017.
U.S. Appl. No. 29/583,852, Keeley, filed Nov. 9, 2016.
International Search Report and Written Opinion in International Application No. PCT/US2017/058067, dated Dec. 15, 2017, 11 pages.
International Preliminary Report on Patentability in Application No. PCT/US2017/058067, dated Apr. 30, 2019, 6 pages.

* cited by examiner

AIR MANIFOLD

CROSS-REFERENCE TO RELATED APPLICATIONS

This application is continuation of U.S. application Ser. No. 15/337,552, filed Oct. 28, 2016. The disclosure of the prior application is considered part of the disclosure of this application, and is incorporated in its entirety into this application.

TECHNICAL FIELD

This invention relates to valves, and more particularly to air manifolds for air valves for use in air beds.

BACKGROUND

People have traditionally used beds that come in many shapes, sizes, and styles. Such beds can range from extremely simple designs to rather complex designs that include a variety of features. For example, some beds can have one or more inflatable air chambers. Some of such beds can include an inflation system including a number of mechanical and electrical components. For example, some beds can include one or more pumps with one or more valves for inflating the air chambers.

SUMMARY

Some embodiments of a pump system can include one or more of the features and functions disclosed herein. Some embodiments can include an air system capable of allowing for deflation of an air bed at two different speeds (e.g. relatively fast and relatively slow). A manifold can have one or more vents sized to allow for relatively slow deflation. The vent can be non-valved, allowing it to be in communication with the manifold during both inflation and deflation operations. A valved exhaust port can be opened when relatively fast deflation is desirable. This can be particularly desirable in inflatable air beds where noise can be undesirable, especially during sleep of a user. Deflation can be performed relatively slowly and quietly when performed while a user is sleeping and can be performed more quickly (and possibly more loudly) when the user is awake and desiring faster deflation.

In one aspect, an air bed system can include a mattress comprising a first inflatable air chamber, an air pump, and an air system. The air system can include a manifold defining a pump inlet fluidly connected to the air pump, a first vent fluidly connected to atmosphere, and a first outlet fluidly connected to the first inflatable air chamber and a first valve operably connected to the manifold to selectively open and close the first outlet. When the first valve is open, the air pump is fluidly connected to both the first vent and the first outlet such that air pumped from the air pump into the manifold can flow out of the manifold through both the first vent and the first outlet when the pump is operating and air can flow from the first inflatable air chamber through the first vent to the atmosphere when the pump is not operating.

Some of the implementations described herein may optionally include one or more of the following features. The mattress comprises a second inflatable air chamber, wherein the manifold defines a second outlet fluidly connected to the second inflatable air chamber, and the air system comprises a second valve operably connected to the manifold to selectively open and close the second outlet. When the second valve is open, the air pump is fluidly connected to both the first vent and the second outlet such that air pumped from the air pump into the manifold can flow out of the manifold through the first vent and the second outlet when the pump is operating and air can flow from the second inflatable air chamber through the first vent to the atmosphere when the pump is not operating. The manifold further defines an exhaust port fluidly connected to atmosphere. The air system comprises a third valve operably connected to the manifold to selectively open and close the exhaust port. The pump is a positive displacement pump and the first vent is non-valved and remains open during substantially all operating conditions regardless of the position of the first, second, and third valves. The manifold further defines an exhaust port fluidly connected to atmosphere and the air system comprises an exhaust valve operably connected to the manifold to selectively open and close the exhaust port. The air system is operable to slowly deflate the first inflatable air chamber via the first vent when the first valve is open and the exhaust valve is close and is operable to quickly deflate the first inflatable air chamber via both the first vent and the exhaust port when the first valve and the exhaust valve are open. A controller can be in communication with the first valve and be configured to send a first signal to open the first valve without opening the exhaust valve to allow for slower deflation of the first inflatable air chamber and to send a second signal to open the first and exhaust valves to allow for faster deflation of the first inflatable air chamber. When the first valve is closed, the first inflatable air chamber is substantially sealed from the manifold and the pump inlet and first vent are in fluid communication.

In another aspect, an air bed system can be operated via the following method. Air can be pumped from a pump into a first inflatable air chamber of the air bed system and through a vent to atmosphere when the air bed system has a first valve configuration and the pump is operating. Air can flow from the first inflatable air chamber through the vent to atmosphere to slowly deflate the first inflatable air chamber when the air bed system has the first valve configuration and the pump is not operating. Air can flow from the first inflatable air chamber through both the vent and a valved exhaust port to atmosphere to quickly deflate the first inflatable air chamber when the air bed system has a second valve configuration.

Some of the implementations described herein may optionally include one or more of the following features. A first air chamber valve is open and an exhaust port valve is closed in the first valve configuration, and both of the first air chamber valve and the exhaust port valve are open in the second configuration. The method further includes pumping air from the pump into a second inflatable air chamber of the air bed system and through the first vent to atmosphere when the air bed system has a third valve configuration and the pump is operating, flowing air from the second inflatable air chamber through the first vent to atmosphere to slowly deflate the second inflatable air chamber when the air bed system has the third valve configuration and the pump is not operating, and flowing air from the second inflatable air chamber through both the first vent and the valved exhaust port to atmosphere to quickly deflate the inflatable air chamber when the air bed system has a fourth valve configuration. A second air chamber valve is closed in the first valve configuration and the second valve configuration. The second air chamber valve is open and both of the first air chamber valve and the exhaust port valve are closed in the third valve configuration. The second air chamber valve and the exhaust port valve are open and the first air chamber valve is closed in the fourth valve configuration. The method further includes automatically deflating the first inflatable air chamber in the first valve configuration in response to sensing user presence on the air bed system and determining that pressure of the first inflatable air chamber should be reduced and deflating the first inflatable air chamber in the second valve configuration in response to receiving a user input to deflate the first inflatable air chamber.

In another aspect, an air system for use in an air bed system includes a manifold and first, second, and third valves. The manifold defines a manifold interior, a first vent fluidly connecting the manifold interior to atmosphere, an exhaust port fluidly connecting the manifold interior to atmosphere, a pump inlet configured for fluidly connecting a pump to the manifold interior, and first and second chamber outlets configured for fluidly connecting the manifold interior to first and second inflatable air chambers. The first valve is operably connected to the manifold for selectively opening and closing the first chamber outlet. The second valve is operably connected to the manifold for selectively opening and closing the second chamber outlet. The third valve is operably connected to the manifold for selectively opening and closing the exhaust port.

Some of the implementations described herein may optionally include one or more of the following features. The first vent is non-valved and remains open during substantially all operating conditions regardless of the position of the first, second, and third valves. A controller is in communication with the first, second, and third valves to selectively open and close the first, second, and third valves. The controller is configured to send a first signal to open the first valve without opening the second and third valves to allow for slower deflation of the first inflatable air chamber. The controller is configured to send a second signal to open the first and third valves without opening the second valve to allow for faster deflation of the first inflatable air chamber. The first vent has a diameter of between 0.005 inch and 0.04 inch and the exhaust port has a diameter of between 0.2 inch and 0.6 inch. The exhaust port has an area about 400 times larger than that of the first vent. A second vent fluidly connects the manifold interior to atmosphere, wherein the first and second vents extend through a top of the air manifold.

The details of one or more embodiments of the invention are set forth in the accompanying drawings and the description below. Other features, objects, and advantages of the invention will be apparent from the description and drawings, and from the claims.

DETAILED DESCRIPTION

An air controller, such as for inflatable air beds, can both inflate and deflate air chambers of a mattress. An air manifold for the air controller can have one or more non-valved vents as well as one or more valved exhaust ports. The air controller can slowly deflate the air chamber without opening the exhaust port via the relatively small vent so as to quietly and slowly reduce pressure while a user is sleeping. The air controller can more quickly reduce pressure when noise is less of a concern by opening the larger exhaust port. This configuration can be particularly desirable in inflatable air beds where noise can be undesirable, especially during sleep of a user, and can allow for automatic pressure adjustment during sleep without waking the user.

Figure 1:
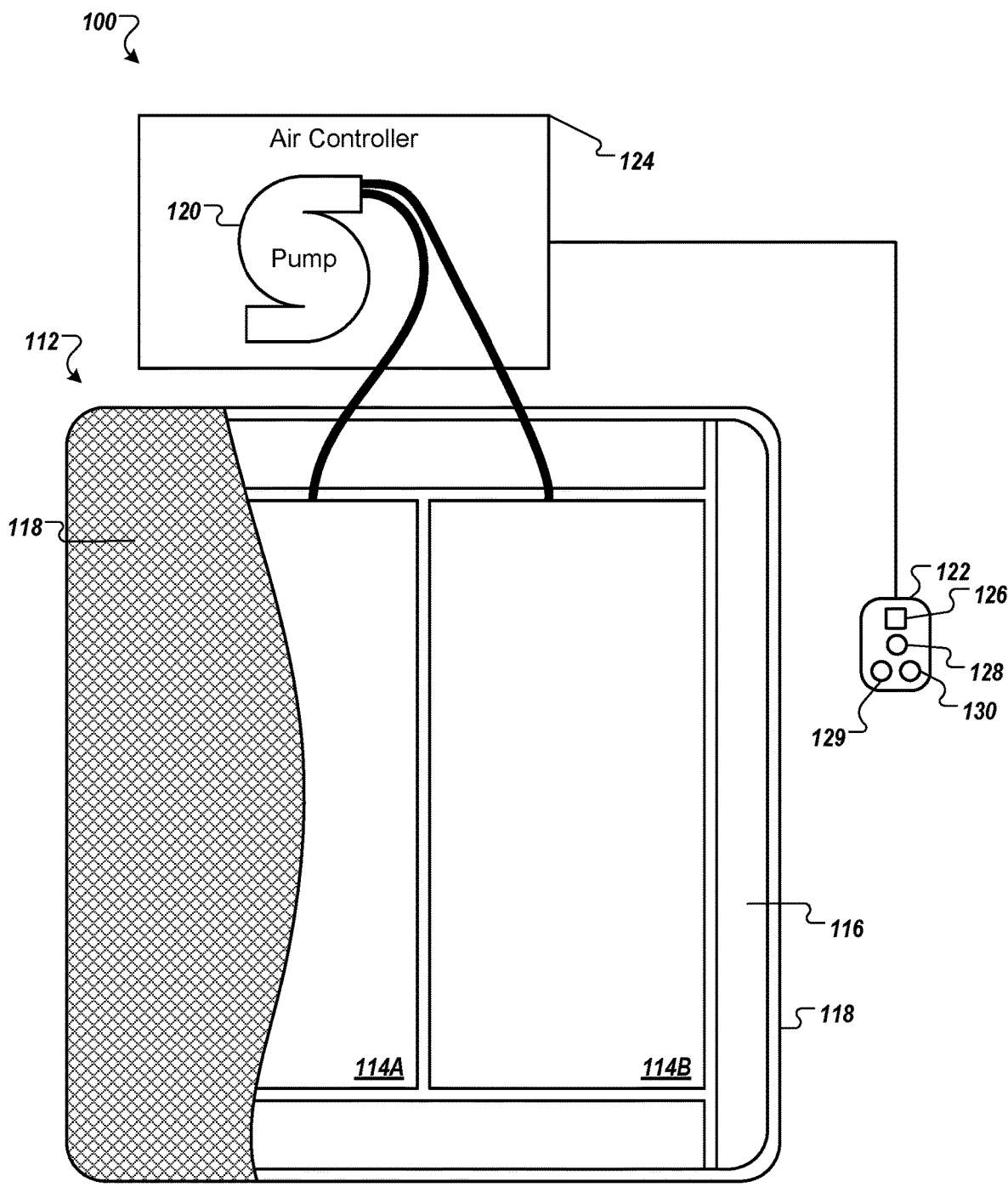
FIG. 1 shows an example air bed system.

FIG. 1 shows an example air bed system 100 that includes a bed 112. The bed 112 includes at least one air chamber 114 surrounded by a resilient border 116 and encapsulated by bed ticking 118. The resilient border 116 can comprise any suitable material, such as foam.

As illustrated in FIG. 1, the bed 112 can be a two chamber design having first and second fluid chambers, such as a first air chamber 114A and a second air chamber 114B. In alternative embodiments, the bed 112 can include chambers for use with fluids other than air that are suitable for the application. In some embodiments, such as single beds or kids' beds, the bed 112 can include a single air chamber 114A or 114B or multiple air chambers 114A and 114B. The first and second air chambers 114A and 114B can be in fluid communication with a pump 120. The pump 120 can be part of an air controller 124, which can be in electrical communication with a remote control 122. The air controller 124 can include a wired or wireless communications interface for communicating with one or more devices, including the remote control 122. The air controller 124 can be configured to operate the pump 120 to cause increases and decreases in the fluid pressure of the first and second air chambers 114A and 114B based upon commands input by a user using the remote control 122. In some implementations, the pump 120 and the air controller 124 can be integrated into a common housing. In other embodiments, the air controller 124 and the pump 120 can be in separate housings.

The remote control 122 can include a display 126, an output selecting mechanism 128, a pressure increase button 129, and a pressure decrease button 130. The output selecting mechanism 128 can allow the user to switch air flow generated by the pump 120 between the first and second air chambers 114A and 114B, thus enabling control of multiple air chambers with a single remote control 122 and a single pump 120. For example, the output selecting mechanism 128 can by a physical control (e.g., switch or button) or an input control displayed on display 126. Alternatively, separate remote control units can be provided for each air chamber and can each include the ability to control multiple air chambers. Pressure increase and decrease buttons 129 and 130 can allow a user to increase or decrease the pressure, respectively, in the air chamber selected with the output selecting mechanism 128. Adjusting the pressure within the selected air chamber can cause a corresponding adjustment to the firmness of the respective air chamber. In some embodiments, the remote control 122 can be omitted or modified as appropriate for an application. For example, in some embodiments the bed 112 can be controlled by a computer, tablet, smart phone, or other device in wired or wireless communication with the bed 112.

Figure 2:
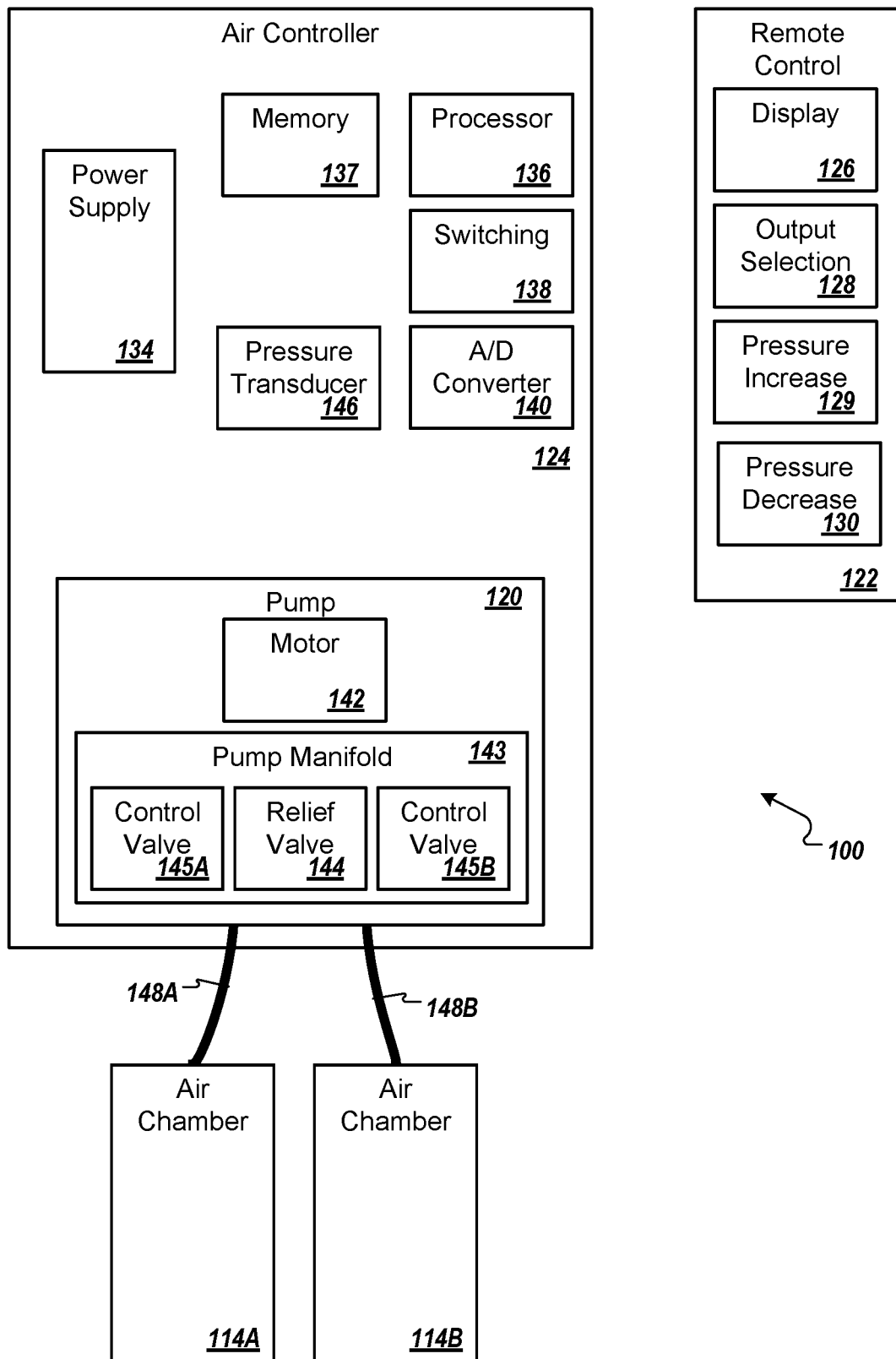
FIG. 2 is a block diagram of an example of various components of an air bed system.

FIG. 2 is a block diagram of an example of various components of an air bed system. For example, these components can be used in the example air bed system 100. As shown in FIG. 2, the air controller 124 can include the pump 120, a power supply 134, a processor 136, a memory 137, a switching mechanism 138, and an analog to digital (A/D) converter 140, an air manifold 143 (having valves 144, 145A, and 145B), and one or more pressure transducers 146. The switching mechanism 138 can be, for example, a relay or a solid state switch.

The pump 120 can include a motor 142. The pump 120 can be fluidly connected to the pump manifold, which is fluidically connected with the first air chamber 114A and the second air chamber 114B via a first tube 148A and a second tube 148B, respectively. The first and second control valves 145A and 145B can be controlled by switching mechanism 138, and are operable to regulate the flow of fluid between the pump 120 and first and second air chambers 114A and 114B, respectively.

In some implementations, the pump 120 and the air controller 124 can be provided and packaged as a single unit. In some alternative implementations, the pump 120 and the air controller 124 can be provided as physically separate units. In some implementations, the air controller 124, the pump 120, or both are integrated within or otherwise contained within a bed frame or bed support structure that supports the bed 112. In some implementations, the air controller 124, the pump 120, or both are located outside of a bed frame or bed support structure (as shown in the example in FIG. 1).

In some embodiments, the pump 120 can be a positive displacement pump. In some of such embodiments, the pump 120 can reduce or prevent back flow. In other embodiments, the pump 120 can be of another type suitable for the application.

The example air bed system 100 depicted in FIG. 2 includes the two air chambers 114A and 114B and the single pump 120. However, other implementations can include an air bed system having two or more air chambers and one or more pumps incorporated into the air bed system to control the air chambers. For example, a separate pump can be associated with each air chamber of the air bed system or a pump can be associated with multiple chambers of the air bed system. Separate pumps can allow each air chamber to be inflated or deflated independently and simultaneously. Furthermore, additional pressure transducers can also be incorporated into the air bed system such that, for example, a separate pressure transducer can be associated with each air chamber.

In use, the processor 136 can, for example, send a decrease pressure command for one of the air chambers 114A or 114B, and the switching mechanism 138 can be used to convert the low voltage command signals sent by the processor 136 to higher operating voltages sufficient to operate the relief valve 144 of the pump 120 and open the control valve 145A or 145B. Opening the relief valve 144 can allow air to escape from the air chamber 114A or 114B through the respective air tube 148A or 148B. During deflation, the pressure transducer 146 can send pressure readings to the processor 136 via the A/D converter 140. The A/D converter 140 can receive analog information from pressure transducer 146 and can convert the analog information to digital information useable by the processor 136. The processor 136 can send the digital signal to the remote control 122 to update the display 126 in order to convey the pressure information to the user. Alternatively, one or more of the air chambers 114A and 114B can be deflated without opening the relief valve 144 as further described below.

As another example, the processor 136 can send an increase pressure command. The pump motor 142 can be energized in response to the increase pressure command and send air to the designated one of the air chambers 114A or 114B through the air tube 148A or 148B via electronically operating the corresponding valve 145A or 145B. While air is being delivered to the designated air chamber 114A or 114B in order to increase the firmness of the chamber, the pressure transducer 146 can sense pressure within the air manifold 143. Again, the pressure transducer 146 can send pressure readings to the processor 136 via the A/D converter 140. The processor 136 can use the information received from the A/D converter 140 to determine the difference between the actual pressure in air chamber 114A or 114B and the desired pressure. The processor 136 can send the digital signal to the remote control 122 to update display 126 in order to convey the pressure information to the user.

Figure 3:
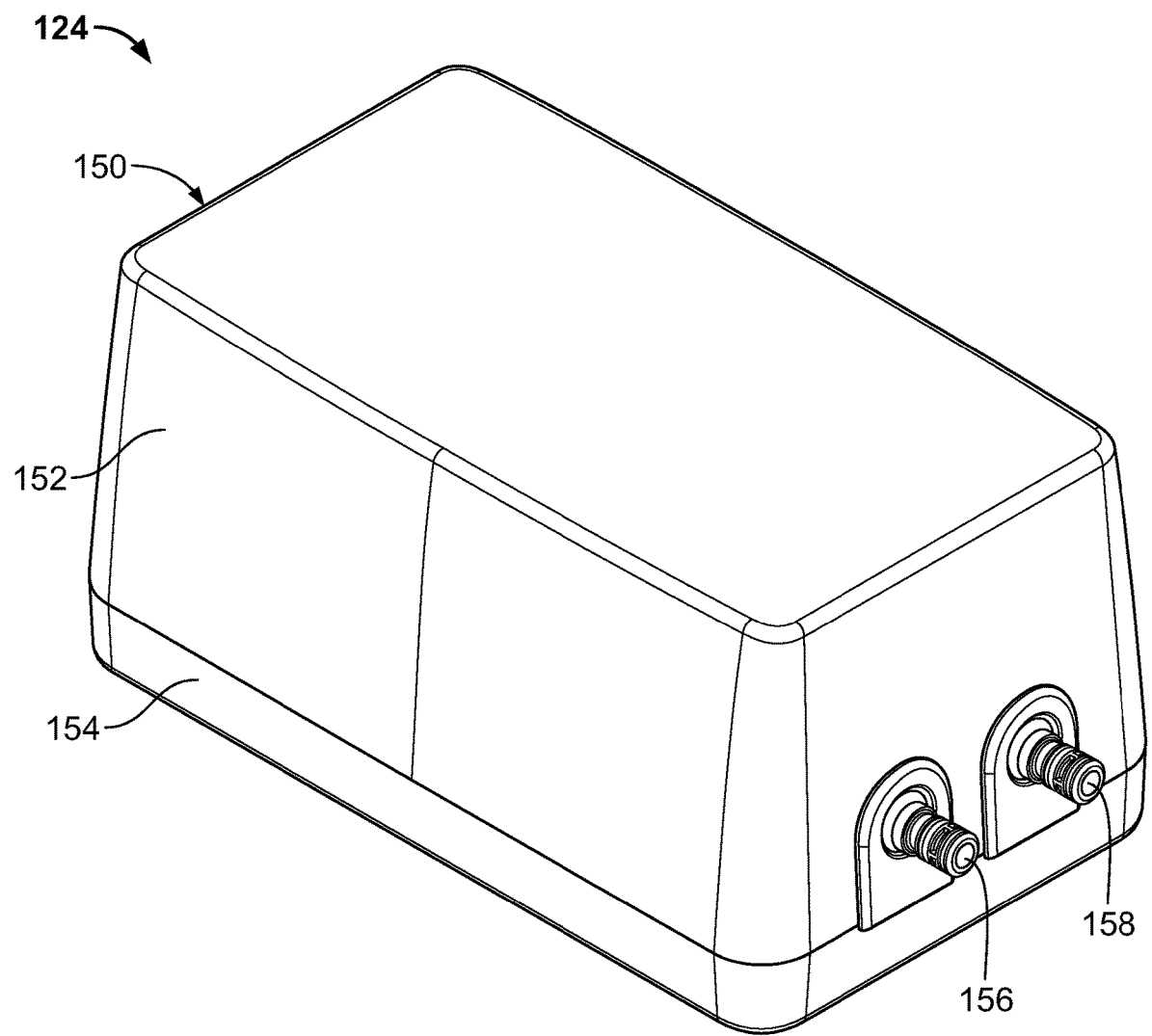
FIG. 3 is a perspective view of an air controller for use in an air bed system.

FIG. 3 is a perspective view of the air controller 124 in a housing 150. The housing 150 can include a housing top 152 and a housing bottom 154 and can substantially enclose components of the air controller 124. One or more outlets 156 and 158 or nozzles can extend through the housing 150 and can be detachably connected to the air tubes 148A and 148B (shown in FIG. 2) for inflating the air chambers 114A and 114B (shown in FIG. 2).

Figure 4:
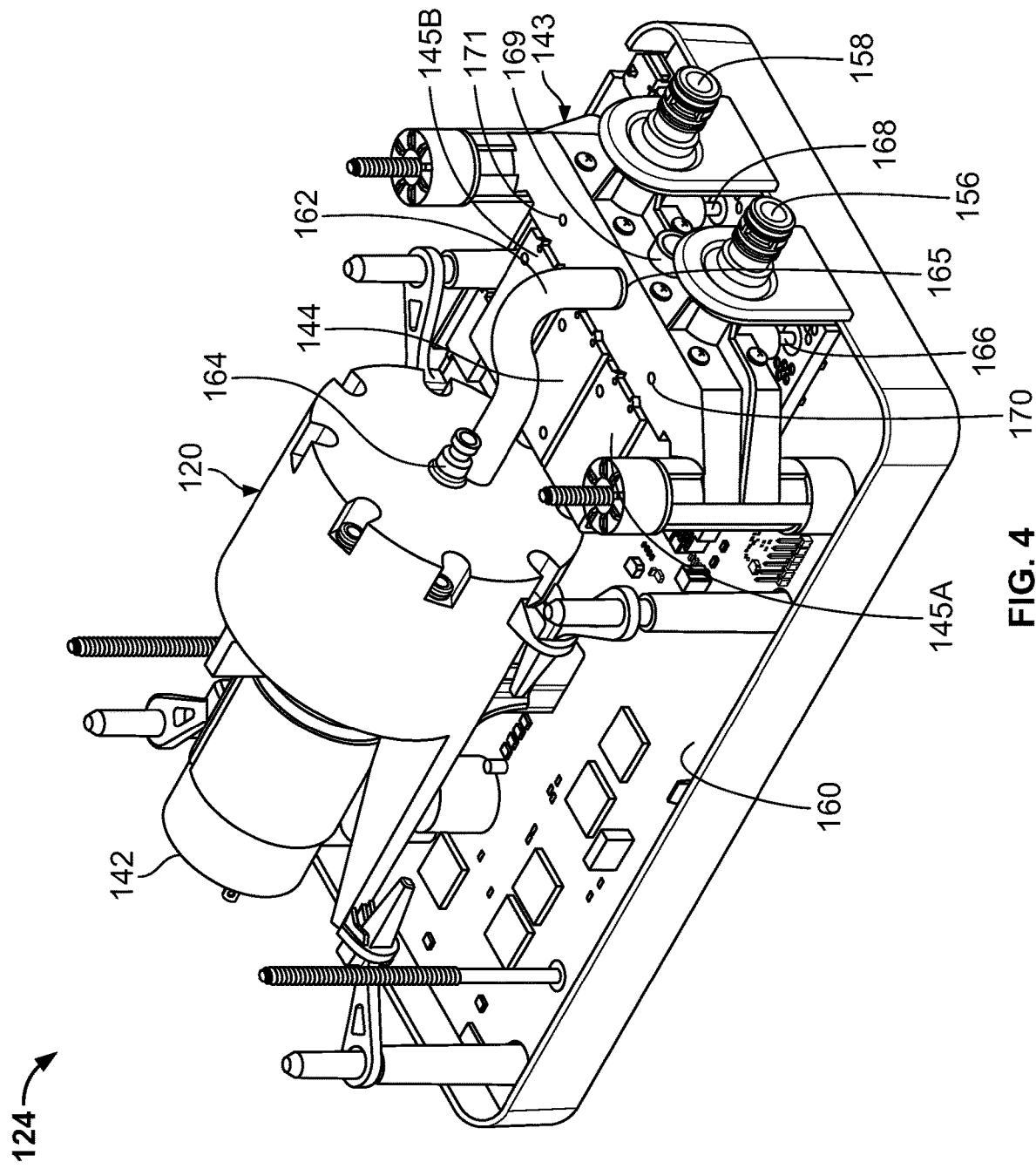
FIG. 4 is a perspective view of the air controller of FIG. 3 with a top of a housing removed.

FIG. 4 is a perspective view of the air controller 124 with the housing top 152 (shown in FIG. 3) removed so as to show internal components. As shown in FIG. 4, the housing 150 of the air controller 124 contains the pump 120 and its motor 142, the air manifold 143, and a printed circuit board 160 (which can include some or all of the power supply 134, the processor 136, the memory 137, the switching mechanism 138, the A/D converter 140, and the pressure transducer 146 shown in FIG. 2).

A tube 162 can extend from a outlet 164 of the pump 120 to an inlet 165 of the air manifold 143 for fluidly connecting the pump 120 to the air manifold 143. One or more additional tubes 166 and 168 can extend from the air manifold 143 to one or more pressure transducers 146 (shown in FIG. 2) on the printed circuit board 160.

Figure 5:
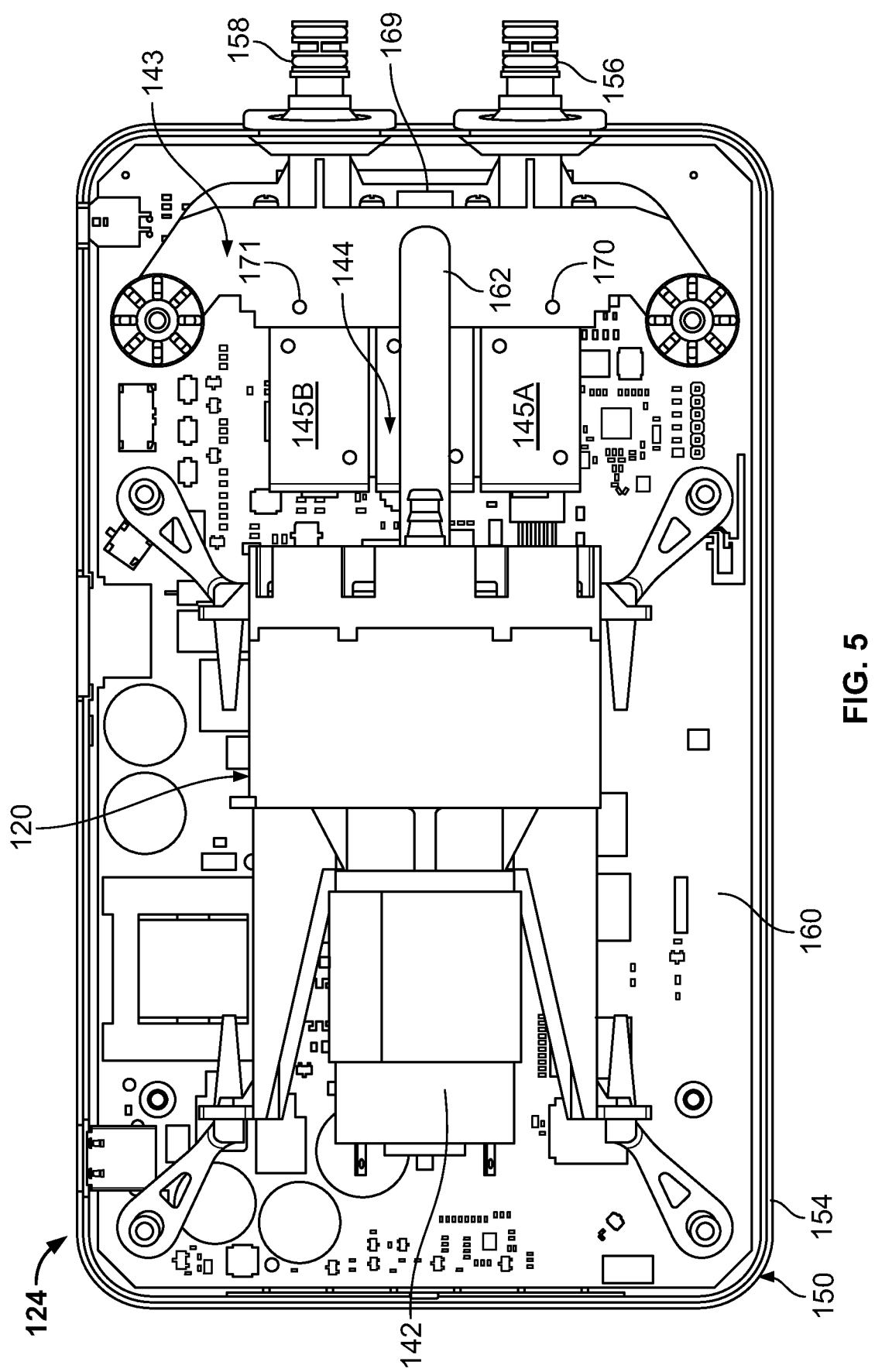
FIG. 5 is a top view of the air controller of FIG. 3 with the top of the housing removed.
Figure 6:
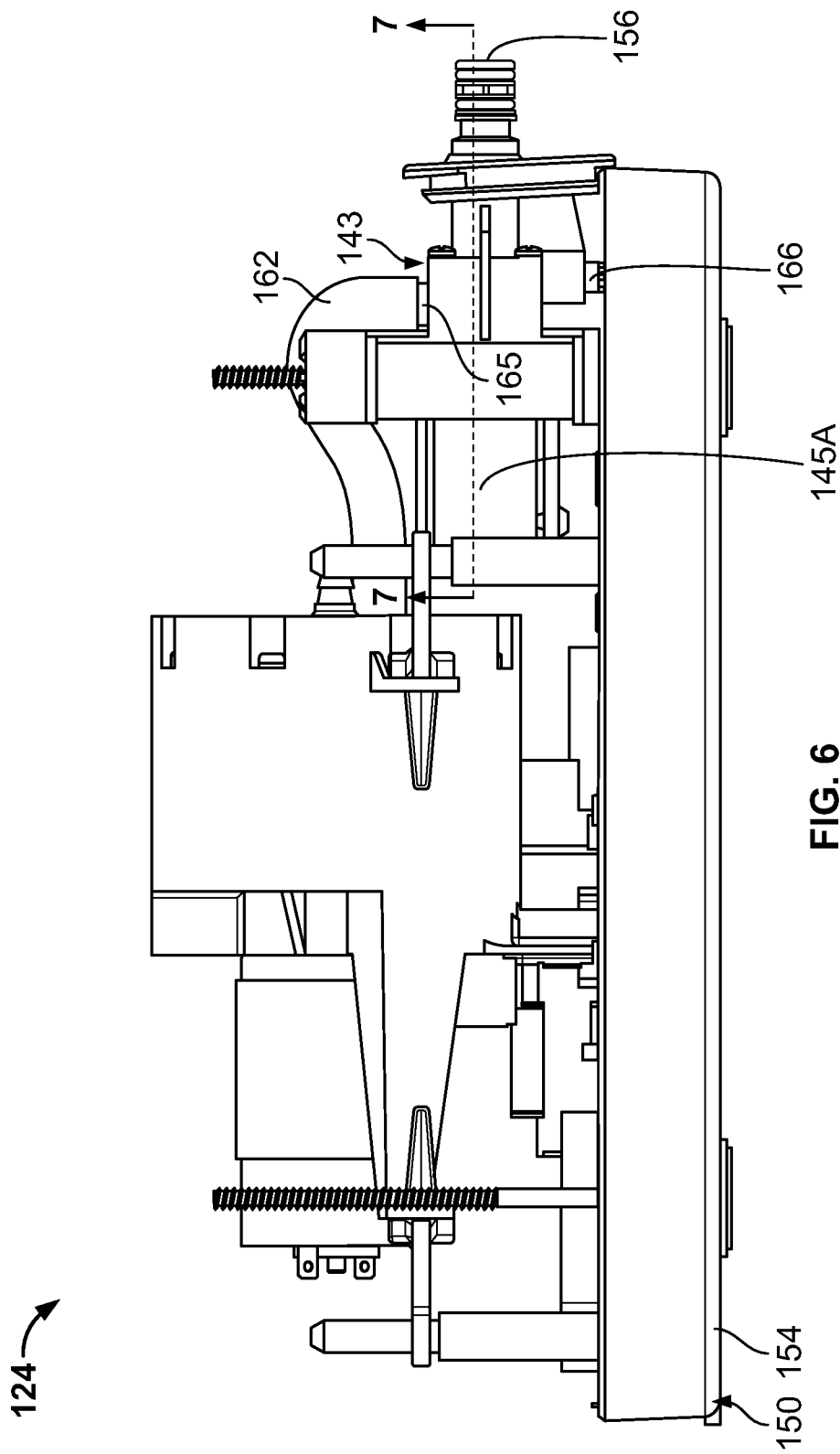
FIG. 6 is a side view of the air controller of FIG. 3 with the top of the housing removed.

FIG. 5 is a top view of the air controller 124 with the housing top 152 removed. FIG. 6 is a side view of the air controller 124 with the housing top 152 removed.

As shown in FIGS. 4-6, the air manifold 143 includes the valves 144, 145A, and 145B attached thereto. The valve 145A can be controlled to selectively open and close to allow and restrict flow through the outlet 156 to the air chamber 114A (shown in FIGS. 1 and 2). The valve 145B can be controlled to selectively open and close to allow and restrict flow through the outlet 158 to the air chamber 114B (shown in FIGS. 1 and 2). The valve 144 can be controlled to selectively open and close to allow and restrict flow through an exhaust port 169, allowing one of the air chambers 114A and 114B to be deflated when one of their respective valves 145A and 145B is open at the same time as the valve 144. Accordingly, the air manifold 143 can selectively allow air flow between the pump 120 (via the tube 162), the air chamber 114A (via the outlet 156), the air chamber 114B (via the outlet 158), and the atmosphere (via the exhaust port 169) depending on the open and closed status of the valves 144, 145A, and 145B.

The air manifold 143 can also include one or more vents 170 and 171. The vents 170 and 171 can connect a manifold interior to atmosphere. The vents 170 and 171 can be non-valved and can remain open during substantially all operating conditions. This can allow for relatively slow deflation of one or more of the air chambers 114A and 114B by opening their corresponding valve 145A or 145B, without necessitating opening of the valve 144.

The vents 170 and 171 can be positioned on a top of the air manifold 143 so as to reduce debris being blown into the vents 170 and 171. Dust falling on or into the vents 170 and 171 can be blown out during a deflation operation, as further explained below. Multiple vents 170 and 171 can be desirable for redundancy in case of one becoming clogged due to the relatively small size of the vents 170 and 171. In the illustrated embodiment, the air manifold 143 includes two vents 170 and 171. In other embodiments, more or less than two vents can be used as suitable for the application.

Figure 7:
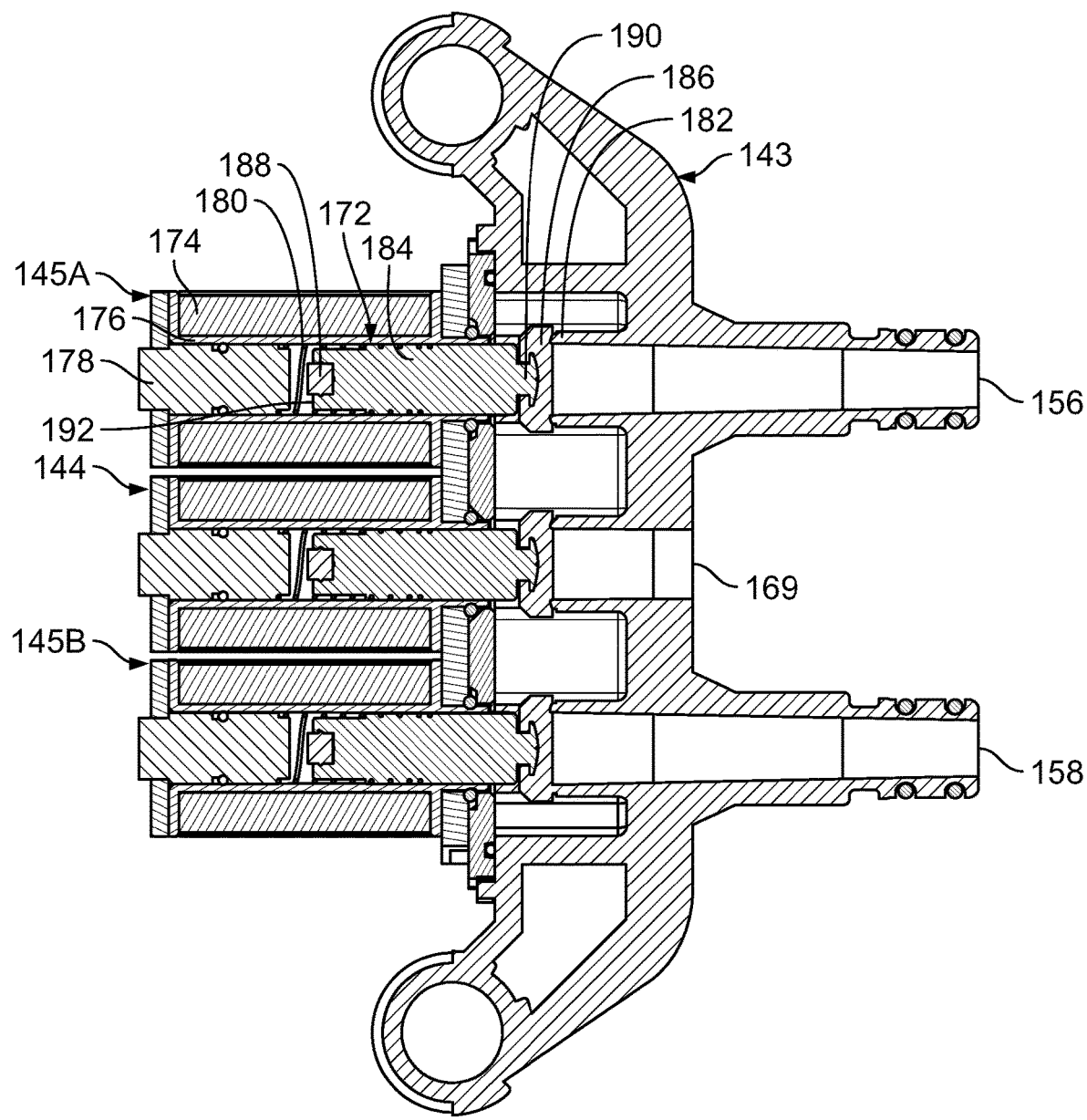
FIG. 7 is a bottom sectional view of an air manifold and valves taken along line 7-7 of FIG. 6.

FIG. 7 is a bottom sectional view of the air manifold 143 along with the valves 144, 145A, and 145B taken along line 7-7 of FIG. 6. In the embodiment shown in FIG. 7, the valves 144, 145A, and 145B are solenoid valves each with a plunger 172. In some embodiments, the valves 144, 145A, and 145B can include some or all of the same or similar components. For example, the valve 145A can include the plunger 172, a solenoid coil 174, a core tube 176, a plug nut 178, a core spring 180, and a valve seat 182. The plunger 172 can include a core 184, a valve disc 186, and a bumper 188. The valve disc 186 is attached to the core 184 at a head 190 of the core 184 and the bumper 188 is attached to the core 184 at a tail 192 of the core 184.

The core 184 can be a metal that responds to a magnetic field (such as iron, nickel, cobalt, certain steels, and certain alloys) and that moves when the solenoid coil 174 is energized. The core 184 is positioned in the core tube 176, which the solenoid coil 174 is wrapped around. The plug nut 178 seals the core tube 176 behind the core 184 and the core spring 180 is positioned between the plug nut 178 and the core 184 in compression.

FIG. 7 shows the valves 144, 145A, and 145B in the sealed position, in which the spring 180 presses against the plunger 172 to seal the valve disc 186 against the valve seat 182. When the solenoid coil 174 is energized, it creates a magnetic field that drives the core 184 in a direction toward the tail 192 until the bumper 188 contacts the plug nut 178, at which point the plunger 172 can remain at rest in an open position. In the open position, the valve disc 186 is spaced from the valve seat 182 allowing flow through the valve seat 182 and the outlet 156. When the solenoid coil 174 is de-energized, the compressed core spring 180 forces the plunger 172 back in the direction toward the head 190 to seal the valve seat 182 with the valve disc 186.

As shown in FIG. 7, the valve disc 186 of the plunger 172 can have a diameter larger than that of the valve seat 182, while the head 190 of the core 184 has a diameter less than that of the valve seat 182. Accordingly, when the plunger 172 closes with the core spring 180 forcing the core 184 toward the valve seat 182, the head 190 can tend to push further into the valve seat 182. Because the valve disc 186 is larger than the valve seat 182 and head 190 of the core 184 is smaller than the valve seat 182, the valve disc 186 can tend to bulge when the valve 145A is closed, with a center of the valve disc 186 pushing into the valve seat 182. This bulging action can further dampen the impact between the plunger 172 and the valve seat 182, as the bulging action can slow and ultimately stop movement of the core 184 more slowly than if the plunger 172 had no bulging action when the valve 145A is closed.

Figure 8:
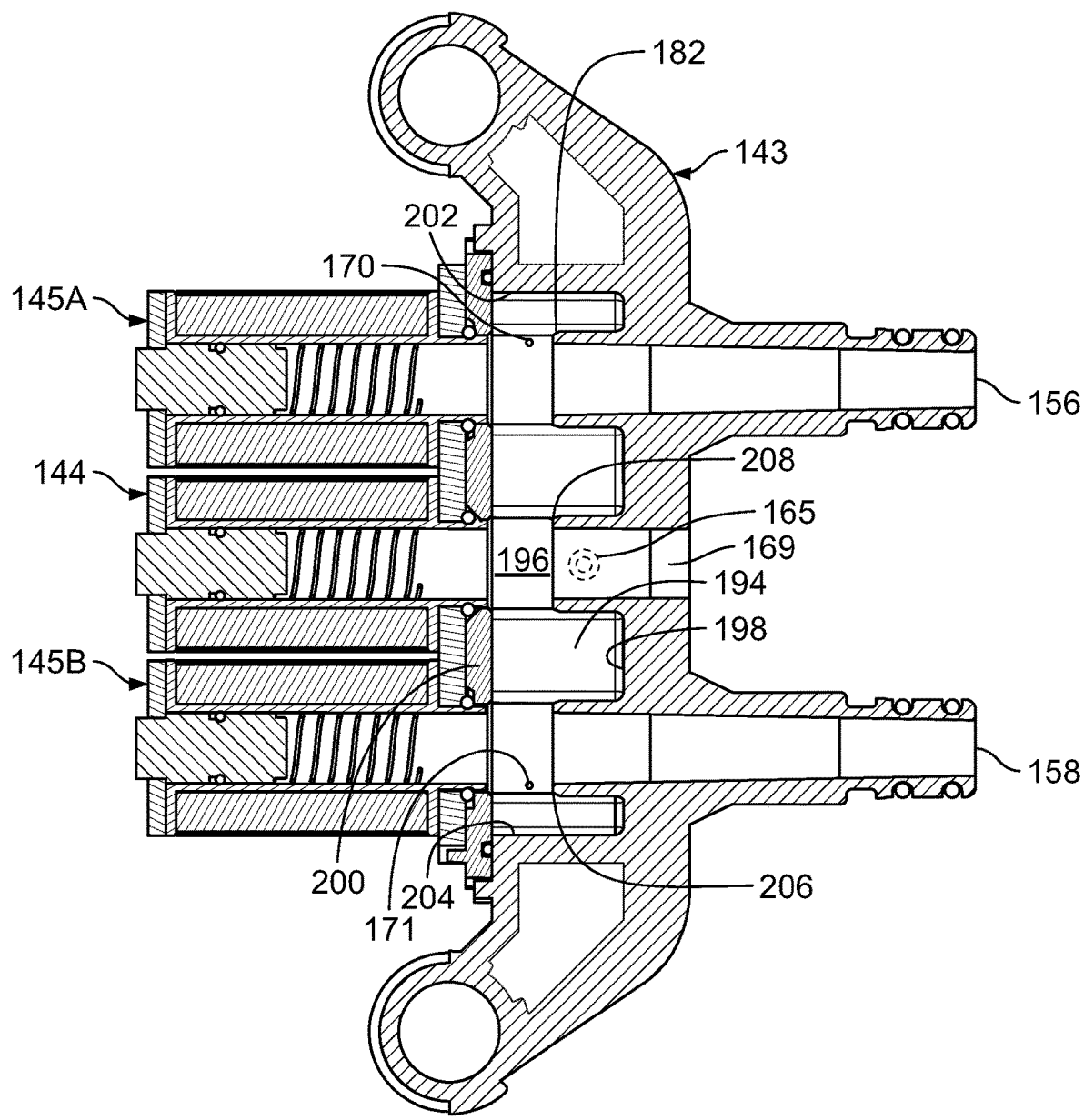
FIG. 8 is a bottom sectional view of the air manifold and valves with plungers removed.

FIG. 8 is a bottom sectional view of the air manifold 143 along with the valves 144, 145A, and 145B with the same view as in FIG. 7, but with the plungers 172 (shown in FIG. 7) removed. With the plungers 172 removed, the vents 170 and 171 can be better viewed. The air manifold 143 defines a manifold interior 194 bounded by a manifold top 196, a manifold front 198, a manifold bottom (not shown in FIG. 8), a manifold back 200, and manifold sides 202 and 204. In the illustrated embodiment, the manifold back 200 is a manifold cover that connects to the rest of the air manifold 143 and is positioned between the valves 144, 145A, and 145B and the rest of the air manifold 143.

As shown in FIG. 8, the valve seat 182 is shown extending from the manifold front 198 into the manifold interior 194. A valve seat 206 corresponding to the valve 145B and a valve seat 208 corresponding to the valve 144 also extend from the manifold front 198 into the manifold interior 194. The valve seats 182, 206, and 208 can be positioned to allow for contact with their respective valve discs 186 (shown in FIG. 7) and to be spaced from the manifold top 196, the manifold side 202, the manifold side 204, and/or the manifold bottom to allow for air flow through the manifold interior 194. For example, the inlet 165 is shown in phantom behind the valve seat 208. The inlet 165 extends through the manifold top 196 to allow the pump 120 to supply air into the manifold interior 194. While the valve seat 208 is positioned below the inlet 165 (which is shown in the orientation of FIG. 8 as positioned above the inlet 165), the valve seat 208 does not prevent the flow of air through the inlet 165.

The terms front, back, top, bottom, side, above, and below are used for reference and illustration purposes, and it should be understood that the air manifold 143 can be inverted or turned to a different orientation. Moreover, the specific shape of the air manifold 143 is one example of a suitable air manifold but it should be understood that the shape may be varied as suitable for the application.

As shown in FIG. 8, the manifold interior 194 can have a number of inlet and outlet openings. For example, the outlet 156, the outlet 158, the inlet 165, the exhaust port 169, the vent 170, and the vent 171 can all be fluidly connected via the manifold interior 194. Flow throughout the manifold interior 194 can be substantially unimpeded and flow into and out of the manifold interior 194 can be substantially unimpeded except via the operation of the valves 144, 145A, and 145B.

For example, when the valves 144, 145A, and 145B are all closed, the inlet 165, the vent 170, and the vent 171 can all be in fluid communication while the outlet 156, the outlet 158, and the exhaust port 169 can be substantially sealed by the valves 145A, 145B, and 144, respectively. Such a valve configuration can be suitable, for example, when the air chambers 114A and 114B are at suitable pressures, and no inflation or deflation is desired.

When the valve 145A is open and the valve 144 and the valve 145B are closed, the inlet 165, the outlet 156, the vent 170, and the vent 171 can be in fluid communication. Such a valve configuration can be suitable, for example, to inflate the air chamber 114A. The pump 120 can be operated to supply air through the inlet 165 into the manifold interior 194 and out the outlet 156 to the air chamber 114A to inflate the air chamber 114A. In embodiments in which the vents 170 and 171 are non-valved, air can also bleed out of the vents 170 and 171 when the pump 120 inflates the air chamber 114A. The vents 170 and 171 can be sized to be small enough in comparison to the outlet defined by the outlet 156 such that the air loss through the vents 170 and 171 is negligible, or at least does not negatively affect the inflation operation in a substantial amount. This valve configuration can also be suitable, for example to slowly deflate the air chamber 114A. When the pump 120 is not operated, air from the air chamber 114A can flow through the outlet 156 into the manifold interior 194 and slowly out the vents 170 and 171. This can allow for slow deflation of the air chamber 114A without requiring the valve 144 to be actuated to open the exhaust port 169.

When the valve 145B is open and the valve 144 and the valve 145A are closed, the inlet 165, the outlet 158, the vent 170, and the vent 171 can be in fluid communication. Such a valve configuration can be suitable, for example, to inflate the air chamber 114B. The pump 120 can be operated to supply air through the inlet 165 into the manifold interior 194 and out the outlet 158 to the air chamber 114B to inflate the air chamber 114B. Air can also bleed out of the vents 170 and 171 when the pump 120 inflates the air chamber 114B, yet the air loss through the vents 170 and 171 need not negatively affect the inflation operation in a substantial amount due to the relatively small size of the vents 170 and 171. This valve configuration can also be suitable, for example to slowly deflate the air chamber 114B. When the pump 120 is not operated, air from the air chamber 114B can flow through the outlet 158 into the manifold interior 194 and slowly out the vents 170 and 171. This can allow for slow deflation of the air chamber 114B without requiring the valve 144 to be actuated to open the exhaust port 169.

When the valve 145A and the valve 144 are open and the valve 145B is closed, the inlet 165, the outlet 156, the exhaust port 169, the vent 170, and the vent 171 can be in fluid communication. Such a valve configuration can be suitable, for example, to quickly deflate the air chamber 114A. When the pump 120 is not operated, air from the air chamber 114A can flow through the outlet 156 into the manifold interior 194 and out the vents 170 and 171 as well as the open exhaust port 169. This can allow for quicker deflation of the air chamber 114A.

When the valve 145B and the valve 144 are open and the valve 145A is closed, the inlet 165, the outlet 158, the exhaust port 169, the vent 170, and the vent 171 can be in fluid communication. Such a valve configuration can be suitable, for example, to quickly deflate the air chamber 114B. When the pump 120 is not operated, air from the air chamber 114B can flow through the outlet 158 into the manifold interior 194 and out the vents 170 and 171 as well as the open exhaust port 169. This can allow for quicker deflation of the air chamber 114B.

Deflation using the vents 170 and 171 as well as the exhaust port 169 can allow for deflation of one or both of the air chambers 114A and 114B relatively quickly. This can be desirable when deflation is performed in response to a user input, such as a command for a softer mattress. In some applications, the sound of the air rushing out of the exhaust port 169 can be noticeably audible. In addition, actuation of the valve 144 can also be noticeably audible. Such sound can be of little concern when the user is awake, such as when the user is issuing a command for deflation. However, such sound can be undesirable while a user is asleep, such as if the air controller 124 is making automatic adjustment to air pressure.

Deflation using the vents 170 and 171 while the exhaust port 169 is closed by the valve 144 can be relatively slow and quiet. Such deflation can be desirable for making automatic pressure adjustments while a user is sleeping, a time where noise is undesirable. While slow deflation may be undesirable when a user issues a command expecting immediate results, slow deflation can be desirable when the air controller 124 seeks to change air pressure in one of the air chambers 114A and 114B without the user noticing.

Accordingly, the exhaust port 169 can be relatively large as compared to the vents 170 and 171 to allow for the ability to deflate at two different speeds. For example, in some embodiments, the exhaust port 169 can have a diameter of about 5/16 inch and the vents 170 and 171 can have a diameter of about 15/1000 inch. In such embodiments, the exhaust port 169 can have a diameter that is about 20 times larger than the diameter of each of the vents 170 and 171 and can have an area that is about 400 times larger than the area of each of the vents 170 and 171 (or about 200 times larger than the combined area of the vents 170 and 171).

In some embodiments, the diameter of the vents 170 and 171 can be between 0.005 inch and 0.04 inch. In some of such embodiments, the diameter of the exhaust port 169 can be between about 0.2 inch and about 0.6 inch. In such embodiments, the exhaust port 169 can have a diameter that is between 5 and 120 times larger than the diameter of each of the vents 170 and 171 and can have an area that is between 25 and 14,400 times larger than the area of each of the vents 170 and 171 (or between 12.5 and 7,200 times larger than the combined area of the vents 170 and 171).

In the illustrated embodiment, the vents 170 and 171 are substantially cylindrical holes, such as pin holes formed in an injection molding process. In other embodiments, the vents 170 and 171 can have another shape or configuration suitable for the application of slowly venting air during a deflation operation.

In some embodiments in which the pump 120 is a positive displacement pump, the pump 120 can allow little or no back flow. Accordingly, little or no air deflated from the air chambers 114A and 114B can flow through the pump 120 during deflation and instead must flow elsewhere, such as through the vents 170 and 171 and/or the exhaust port 169.

Figure 9:
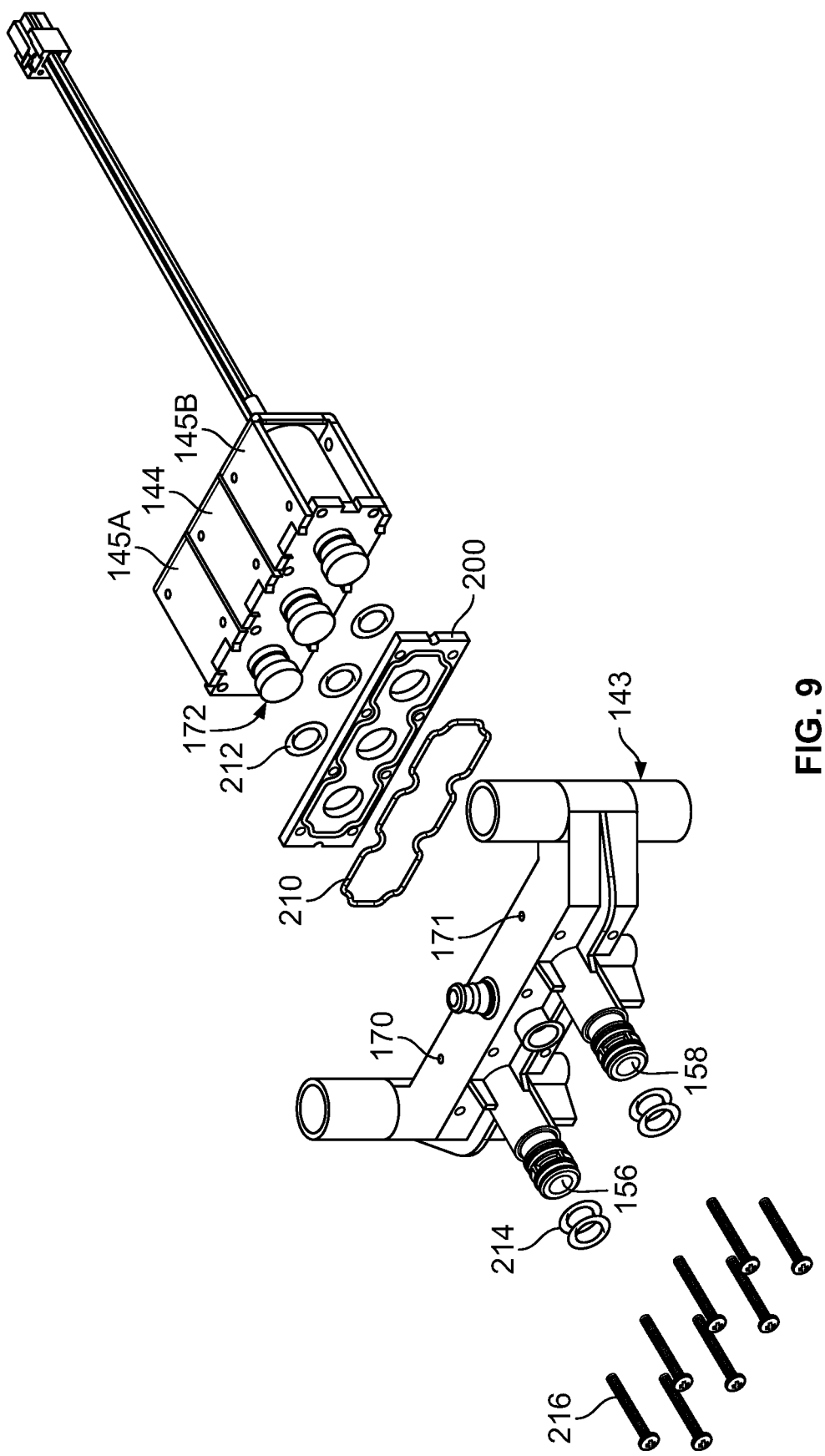
FIG. 9 is a perspective exploded view of the air manifold and valves.

FIG. 9 is a perspective exploded view of the air manifold 143 and the valves 144, 145A, and 145B. FIG. 9 shows a gasket 210 positioned between the manifold back 200 (or manifold cover) and the rest of the air manifold 143, O-rings 212 between the manifold back 200 and the valves 144, 145A, and 145B, and O-rings 214 on the outlets 156 and 158. The gasket 210 and the O-rings 212 and 214 can substantially seal the air manifold 143 when assembled, except through designated openings such as the vents 170 and 171. One or more bolts 216 or other fasteners can connect the air manifold 143 to the valves 144, 145A, and 145B.

Accordingly, an air bed system can include an air controller configured to deflate an air chamber at different speeds. For example, an air manifold can include one or more relatively small vents in addition to a larger valved exhaust port. This can allow the air controller to slowly deflate an air chamber without opening the exhaust port using the vent so as to quietly and slowly reduce pressure while a user is sleeping, and to more quickly reduce pressure when noise is less of a concern. Noise can be reduced during slow deflation because fewer valves require actuation, thus producing less sound. Additionally, noise can also be reduced due to a smaller volume of air passing through the vents than through the relatively larger exhaust port.

A number of embodiments of the invention have been described. Nevertheless, it will be understood that various modifications may be made without departing from the spirit and scope of the invention. For example, various components illustrated in the air controller 124, such as the pump 120, the air manifold 143, and the printed circuit board 160, can be modified as suitable for a given application. Moreover, one or more features present on one or more of the various embodiments can be considered optional, and need not necessarily be included in all embodiments. Accordingly, other embodiments are within the scope of the following claims.

What is claimed is:

1. An air bed system comprising:
a mattress comprising a first inflatable air chamber;
an air pump; and
an air system comprising:
a manifold defining a pump inlet fluidly connected to the air pump, a first vent fluidly connected to atmosphere, and a first outlet fluidly connected to the first inflatable air chamber; and
a first valve operably connected to the manifold to selectively open and close the first outlet,
wherein the air system comprises no valve covering coupled to the first vent such that the first vent remains open when the first valve is open and when the first valve is closed.

2. The air bed system of claim 1, wherein the mattress comprises a second inflatable air chamber, wherein the manifold defines a second outlet fluidly connected to the second inflatable air chamber, and wherein the air system comprises a second valve operably connected to the manifold to selectively open and close the second outlet.

3. The air bed system of claim 2, wherein when the second valve is open, the air pump is fluidly connected to both the first vent and the second outlet such that air pumped from the air pump into the manifold can flow out of the manifold through the first vent and the second outlet when the pump is operating and air can flow from the second inflatable air chamber through the first vent to the atmosphere when the pump is not operating.

4. The air bed system of claim 1, wherein the pump is a positive displacement pump.

5. The air bed system of claim 1, wherein the manifold further defines an exhaust port fluidly connected to atmosphere and wherein the air system comprises an exhaust valve operably connected to the manifold to selectively open and close the exhaust port.

6. The air bed system of claim 5, wherein the air system is operable to slowly deflate the first inflatable air chamber via the first vent when the first valve is open and the exhaust valve is closed and is operable to quickly deflate the first inflatable air chamber via both the first vent and the exhaust port when the first valve and the exhaust valve are open.

7. The air bed of claim 5, and further comprising:
a controller in communication with the first valve and configured to send a first signal to open the first valve without opening the exhaust valve to allow for slower deflation of the first inflatable air chamber and to send a second signal to open the first valve and the exhaust valve to allow for faster deflation of the first inflatable air chamber.

8. The air bed system of claim 1, wherein when the first valve is closed, the first inflatable air chamber is substantially sealed from the manifold and the pump inlet is in fluid communication with the first vent.

9. The air bed system of claim 1, wherein the manifold further defines a second vent fluidly connected to atmosphere, wherein the air system comprises no valve covering the second vent such that the second vent remains open, and wherein the first and second vents remain open allowing airflow between the manifold and atmosphere regardless of whether any valve of the air system is open.

10. A method of operating an air bed system having a pump, a manifold, one or more valves, and a first inflatable air chamber, the method comprising:
when in a first valve configuration and the pump is operating, pumping air from the pump through the manifold into the first inflatable air chamber of the air bed system and pumping air from the pump through the manifold to atmosphere;
when in the first valve configuration and the pump is not operating, flowing air from the first inflatable air chamber through the manifold to atmosphere to slowly deflate the first inflatable air chamber; and
when in a second valve configuration and the pump is not operating, flowing air from the first inflatable air chamber through at least a valved exhaust port to atmosphere to quickly deflate the first inflatable air chamber, wherein the first inflatable air chamber is deflated more quickly in the second valve configuration than in the first valve configuration.

11. The method of claim 10, wherein the valved exhaust port includes an exhaust port valve and wherein a first air chamber valve is open and the exhaust port valve is closed in the first valve configuration and wherein both of the first air chamber valve and the exhaust port valve are open in the second configuration.

12. The method of claim 10, the method further comprising:
when in a third valve configuration and the pump is operating, pumping air from the pump through the manifold into a second inflatable air chamber of the air bed system and pumping air from the pump through the manifold to atmosphere;
when in the third valve configuration and the pump is not operating, flowing air from the second inflatable air chamber through the manifold to atmosphere to slowly deflate the second inflatable air chamber; and
when in a fourth valve configuration and the pump is not operating, flowing air from the second inflatable air chamber through at least the valved exhaust port to atmosphere to quickly deflate the second inflatable air chamber, wherein the second inflatable air chamber is deflated more quickly in the fourth valve configuration than in the third valve configuration.

13. The method of claim 12, wherein a second air chamber valve is closed in the first valve configuration and the second valve configuration, wherein the second air chamber valve is open and both of the first air chamber valve and the exhaust port valve are closed in the third valve configuration, and wherein the second air chamber valve and the exhaust port valve are open and the first air chamber valve is closed in the fourth valve configuration.

14. The method of claim 12, the method further comprising:
automatically deflating the first inflatable air chamber in the first valve configuration in response to sensing user presence on the air bed system and determining that pressure of the first inflatable air chamber should be reduced; and
deflating the first inflatable air chamber in the second valve configuration in response to receiving a user input to deflate the first inflatable air chamber.

15. The method of claim 10, the method further comprising:
maintaining the first air chamber sealed via the one or more valves when in a fifth valve configuration.

16. The method of claim 10, wherein the manifold comprise a manifold cover and a gasket sized and positioned for sealing the manifold cover.

17. An air system for use in an air bed system, the air system comprising:
- a manifold defining a manifold interior, a first vent fluidly connecting the manifold interior to atmosphere, an exhaust port fluidly connecting the manifold interior to atmosphere, a pump inlet configured for fluidly connecting a pump to the manifold interior, and first and second chamber outlets configured for fluidly connecting the manifold interior to first and second inflatable air chambers;
- a first valve operably connected to the manifold for selectively opening and closing the first chamber outlet;
- a second valve operably connected to the manifold for selectively opening and closing the second chamber outlet;
- a third valve operably connected to the manifold for selectively opening and closing the exhaust port, wherein no valve is operably connected to the manifold for selectively opening and closing the first vent.

18. The air system of claim 17, wherein the controller is configured to send a first signal to open the first valve without opening the second and third valves to allow for slower deflation of the first inflatable air chamber and wherein the controller is configured to send a second signal to open the first and third valves without opening the second valve to allow for faster deflation of the first inflatable air chamber.

19. The air system of claim 17, wherein the first vent has a diameter of between 0.005 inch and 0.04 inch and the exhaust port has a diameter of between 0.2 inch and 0.6 inch.

20. The air system of claim 17, and further comprising a second vent fluidly connecting the manifold interior to atmosphere, wherein the first and second vents extend through a top of the manifold, and wherein the manifold comprises at least one gasket and at least one o-ring to seal portions of the manifold without sealing the first and second vents.

* * * * *